(12) United States Patent
Watanabe et al.

(10) Patent No.: US 11,689,804 B2
(45) Date of Patent: Jun. 27, 2023

(54) IMAGE SENSOR (71) Applicant: OMRON Corporation, Kyoto (JP)

(72) Inventors: Kosuke Watanabe, Kyoto (JP); Yasuhito Uetsuji, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 120 days.

(21) Appl. No.: 17/604,933

(22) PCT Filed: Mar. 16, 2020

(86) PCT No.: PCT/JP2020/011430
§ 371 (c)(1),
(2) Date: Oct. 19, 2021

(87) PCT Pub. No.: WO2020/217778
PCT Pub. Date: Oct. 29, 2020

(65) Prior Publication Data
US 2022/0210329 A1   Jun. 30, 2022

(30) Foreign Application Priority Data
Apr. 26, 2019   (JP) .................................. 2019-085462

(51) Int. Cl.
*H04N 23/667* (2023.01)
*G02F 1/29* (2006.01)

(52) U.S. Cl.
CPC ............. *H04N 23/667* (2023.01); *G02F 1/29* (2013.01)

(58) Field of Classification Search
CPC .................................................. H04N 23/667
(Continued)

(56) References Cited

U.S. PATENT DOCUMENTS

2011/0200314 A1   8/2011   Kawashima
2012/0024954 A1   2/2012   Komi
(Continued)

FOREIGN PATENT DOCUMENTS

CN   108415153 A   8/2018
JP   2006093805 A   4/2006
(Continued)

OTHER PUBLICATIONS

International Search Report issued in Intl. Appln. No PCT/JP2020/011430 dated Jun. 2, 2020. English translation provided.
(Continued)

*Primary Examiner* — Joel W Fosselman
(74) *Attorney, Agent, or Firm* — Rossi, Kimms & McDowell LLP (57) ABSTRACT

An image sensor includes an imaging device, an optical system including a liquid lens to form an image of a subject on an imaging surface of the imaging device, and a controller that performs a refractive power control process of adjusting an application voltage applicable to the liquid lens to control a refractive power of the liquid lens, and a recognition process of analyzing image data from the imaging device to recognize predetermined information about the subject. The controller is operable in a plurality of operation modes each with a different wait period from a change in the application voltage to the liquid lens in response to the refractive power control process to a start of the recognition process.

10 Claims, 4 Drawing Sheets

(58) Field of Classification Search
USPC .................................................... 348/231.6
See application file for complete search history.

(56) References Cited

U.S. PATENT DOCUMENTS

| | | | |
|---|---|---|---|
| 2012/0261474 A1 | 10/2012 | Kawashime | |
| 2017/0090076 A1 | 3/2017 | Nunnink | |
| 2018/0164576 A1 | 6/2018 | Tseng et al. | |
| 2021/0208387 A1* | 7/2021 | Karam | ................ G03B 5/00 |

FOREIGN PATENT DOCUMENTS

| | | | |
|---|---|---|---|
| JP | 2010262246 A | 11/2010 | |
| JP | 2011047883 A | 3/2011 | |
| JP | 2011530722 A | 12/2011 | |
| JP | 2013117594 A | 6/2013 | |
| JP | 2017106967 A | 6/2017 | |
| KR | 1020070120773 A | 12/2007 | |
| WO | 2010143662 A1 | 12/2010 | |
| WO | 2011052770 A1 | 5/2011 | |
| WO | 2019072360 A1 | 4/2019 | |

OTHER PUBLICATIONS

Written Opinion issued in Intl. Appln. No. PCT/JP2020/011430 dated Jun. 2, 2020. English translation provided.

Office Action issued in Chinese Appln. No. 202080031296.7 dated Dec. 2, 2022. English translation provided.

Extended European Search Report issued in European Appln. No. 20794554.4 dated Dec. 7, 2022.

Berge et al. "Liquid lens based on electrowetting: actual developments on larger aperture and multiple electrodes design for image stabilization or beam steering", Proceedings of SPIE, vol. 8616. Mar. 2013. pp. 861612-1-861612-9. Cited in NPL 2.

* cited by examiner

|  | Fast mode (Accuracy: 2 pix) | Normal mode (Accuracy: 1.5 pix) | Accurate mode (Accuracy: 1 pix) |
|---|---|---|---|
| CM-A x LM-A | 25 ms | 40 ms | 100 ms |
| CM-B x LM-A | 50 ms | 70 ms | 175 ms |
| CM-A x LM-B | 85 ms | 160 ms | 300 ms |
|  |  |  |  |
|  |  |  |  |

IMAGE SENSOR

FIELD

The present invention relates to an image sensor including an optical system with a liquid lens.

BACKGROUND

Known small sensor systems capture images of inspection targets and analyze the captured images to inspect and measure the inspection targets. Such sensor systems (hereafter, image sensors) typically change the positions of selected lenses along the optical axis mechanically to adjust the focus. Some image sensors include liquid lenses to adjust the focus (refer to, for example, Patent Literature 1). A liquid lens is an optical component containing a conductive water solution and a nonconductive oil sealed in a lens holder, with the oil-water interface deforming to change the refractive power in response to a voltage applied.

CITATION LIST

Patent Literature

Patent Literature 1: U.S. Patent Application Publication No. 2017/0090076

SUMMARY

Technical Problem

Image sensors with different degrees of accuracy may be used for image capturing for different uses (different inspection targets and inspection items). For example, measuring the dimensions or checking for small flaws uses captured images that are accurate with no blur, whereas reading large-print codes or detecting printed letters or labels may use images with a permissible degree of blurring. A liquid lens typically produces more accurate images when a longer wait period is used between a change in the application voltage and image capturing. Setting the same wait period uniformly for applications with low accuracy and with high accuracy may cause a time loss for low-accuracy applications and cause a lack of accuracy for high-accuracy applications.

In response to the above issue, one or more aspects of the present invention are directed to an image sensor including an optical system with a liquid lens that adjusts the wait period from voltage application to the liquid lens to the start of a recognition process with accuracy intended by a user.

Solution to Problem

An image sensor according to one aspect of the present invention includes an imaging device, an optical system including a liquid lens to form an image of a subject on an imaging surface of the imaging device, and a controller that performs a refractive power control process of adjusting an application voltage applicable to the liquid lens to control a refractive power of the liquid lens, and a recognition process of analyzing image data from the imaging device to recognize predetermined information about the subject. The controller is operable in a plurality of operation modes each with a different wait period from a change in the application voltage to the liquid lens in response to the refractive power control process to a start of the recognition process.

For the recognition process to analyze image data from the imaging device and recognize predetermined information about the subject after a change in the application voltage to the liquid lens to adjust the focus, a longer wait period from the change in the application voltage to the start of the recognition process increases the accuracy of image data produced by image capturing and extends the time from the change in the application voltage to obtaining the analysis result. The image sensor is operable in a plurality of operation modes with different wait periods. The image sensor designates (selects) the operation mode to adjust the wait period with accuracy intended by the user.

The controller may operate in an operation mode of the plurality of operation modes designated by a user. Based on a target value for a blur circle diameter designated by a user, the controller may select, from the plurality of operation modes, an operation mode with a blur circle diameter at the start of the recognition process closest to the target value, and operate in the selected operation mode. The controller may select, from the plurality of operation modes, an operation mode with a wait period closest to a wait period designated by a user, and operate in the selected operation mode.

The image sensor may further include a body module including the controller, and a lens module including the optical system and a memory. The memory may store first information indicating a specification for the lens module or a type of the lens module. The controller may change, based on the first information read from the memory included in the lens module, the wait period for at least one of the plurality of operation modes to a period corresponding to the lens module. The image sensor with this structure can use a replaceable lens module and adjust the wait period for at least one operation mode to the period corresponding to the lens module attached to the body module.

The image sensor may further include a body module including the controller, an imaging module including the imaging device, and a lens module including the optical system and a memory. The memory may store first information indicating a specification for the lens module or a type of the lens module. The controller may change, based on the first information read from the memory included in the lens module and second information read from a memory included in the imaging module, the wait period for at least one of the plurality of operation modes to a period corresponding to a combination of the lens module and the imaging device included in the imaging module. The image sensor with this structure can use a replaceable lens module and a replaceable imaging module, and adjust the wait period for at least one operation mode to the period corresponding to the combination of the lens module and the imaging module attached to the body module.

In the image sensor with the above structure, the first information may include blur circle diameter information indicating a change in a blur circle diameter with time after the application voltage is applied to the liquid lens. The second information may include pixel pitch information indicating a pixel pitch of the imaging device. The controller may change, based on the blur circle diameter information and the pixel pitch information, the wait period for each of the plurality of operation modes to a period that allows a blur circle diameter at the start of the recognition process to match a dimension associated with the operation mode.

Advantageous Effects

The image sensor according to the above aspects of the present invention includes an optical system with a liquid lens. The image sensor adjusts the wait period from voltage application to the liquid lens to the start of a recognition process with accuracy intended by a user.

DETAILED DESCRIPTION

Embodiments of the present invention will now be described with reference to the drawings.

First Embodiment

Figure 1:
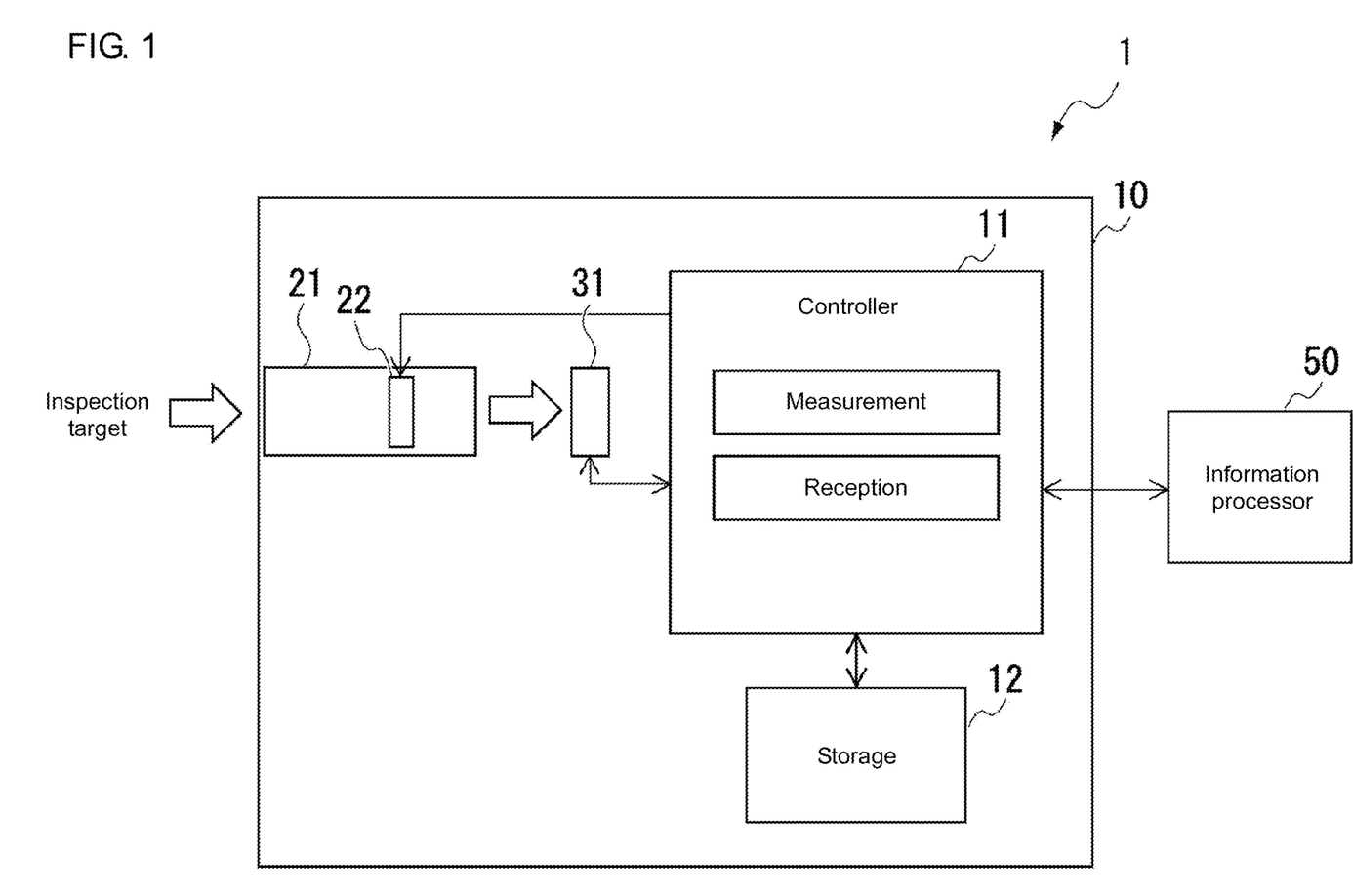
FIG. 1 is a diagram of an image sensor according to a first embodiment of the present invention.

FIG. 1 is a diagram of an image sensor 1 according to a first embodiment of the present invention.

As shown in the figure, the image sensor 1 according to the present embodiment is an integrated image sensor including an optical system 21, an imaging device 31, a controller 11, and a storage 12. The image sensor 1 is connected to an information processor 50 when in use. The information processor 50 is a computer with an operation program for using the image sensor 1 installed. The information processor 50 is typically connected to multiple image sensors 1.

The imaging device 31 is an image sensing device (monochrome in the present embodiment), such as a complementary metal-oxide-semiconductor (CMOS) image sensing device or a charge-coupled device (CCD) image sensing device. The optical system 21 combines lenses to form an image of an inspection target (subject) on the imaging surface of the imaging device 31. The optical system 21 includes a liquid lens 22 as an optical member having the refractive power controllable in accordance with the application voltage.

The storage 12 includes a random-access memory (RAM) to be used as a work area by the controller 11 and a nonvolatile memory such as a flash memory. The nonvolatile memory in the storage 12 stores a wait period t1 for a fast mode, a wait period t2 for a normal mode, a wait period t3 for an accurate mode, and operation-mode designation information.

The operation-mode designation information designates the operation mode of the controller 11 to be any of the fast mode, the normal mode, and the accurate mode. The controller 11 operates in the operation mode designated by the operation-mode designation information. The operation-mode designation information thus also indicates the current operation mode of the controller 11.

The wait periods t1 to t3 for the modes are defined as described below using the relationship between the elapsed period after the voltage application to the liquid lens 22 and the blur circle diameter of the optical system 21, the pixel pitch P of the imaging device 31, and the proportionality constants $\alpha$, $\beta$, and $\gamma$ ($\alpha > \beta > \gamma \geq 1$).

The wait period t1 for the fast mode refers to the period taken for the optical system 21 to have a blur circle diameter matching $\alpha \times P$ after a change in the application voltage to the liquid lens 22.

The wait period t2 for the normal mode refers to the period taken for the optical system 21 to have a blur circle diameter matching $\beta \times P$ after a change in the application voltage to the liquid lens 22.

The wait period t3 for the accurate mode refers to the period taken for the optical system 21 to have a blur circle diameter matching $\gamma \times P$ after a change in the application voltage to the liquid lens 22.

The wait periods t1 to t3 for the modes are defined as described above for the reasons described later.

The controller 11 performs a measurement process and a reception process. The controller 11 reads the wait periods t1 to t3 for the modes into the RAM in the storage 12 when the image sensor 1 is turned on. The controller 11 reads operation-mode designation information to determine that (or stores information indicating that) the current operation mode (hereafter, a current mode) is the operation mode (the fast mode, the normal mode, or the accurate mode) indicated by the read operation-mode designation information.

Figure 2:
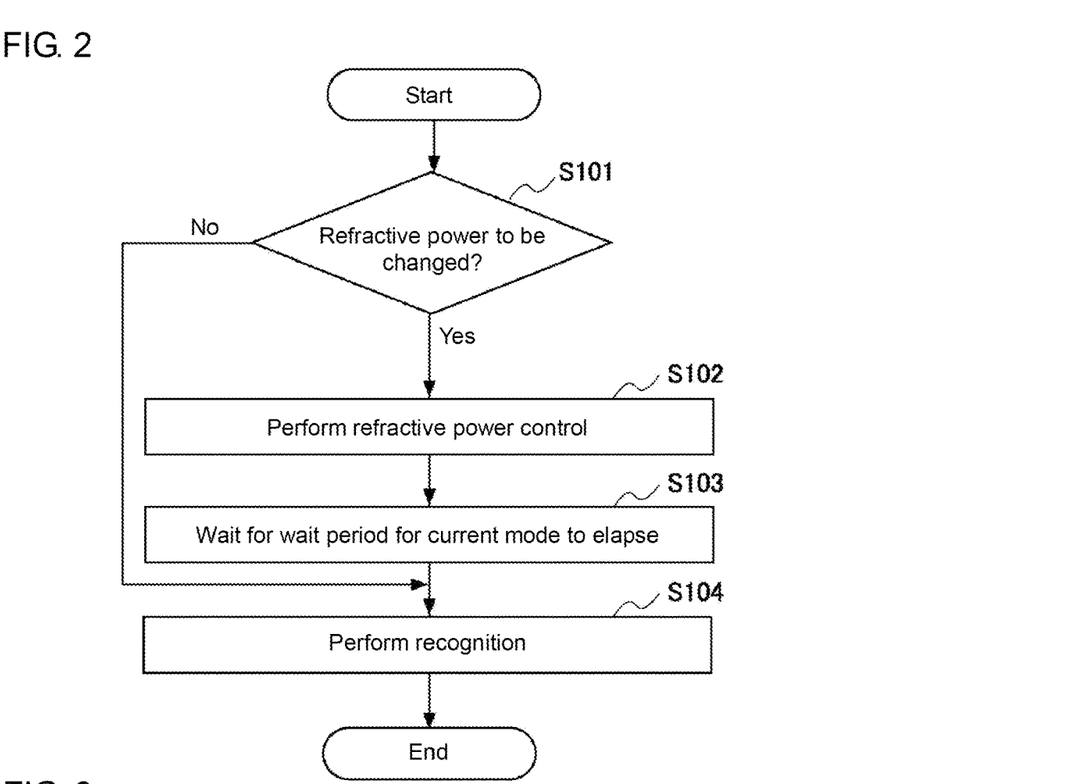
FIG. 2 is a flowchart of a measurement process performed by a controller in the image sensor according to the first embodiment.

FIG. 2 shows the measurement process. The controller 11 performs the measurement process in response to a measurement process instruction from the information processor 50. The measurement process instruction includes designation information about the installation distance. The installation distance refers to the distance from the front end of the optical system 21 to the inspection target.

In the measurement process shown in the figure, the controller 11 first compares, with the current installation distance, the installation distance designated by the designation information included in the measurement process instruction. The controller 11 thus determines whether the refractive power of the liquid lens 22 is to be changed (step S101). When the refractive power of the liquid lens 22 is to be changed (Yes in step S101), the controller 11 performs a refractive power control process (step S102). The refractive power control process refers to adjusting the application voltage to the liquid lens 22 to control the refractive power of the liquid lens 22. In the refractive power control process, the controller 11 determines the voltage to be applied to the liquid lens 22 based on the installation distance (the installation distance after the change) designated by the designation information. The controller 11 then applies the determined voltage to the liquid lens 22.

Upon completing the refractive power control process, the controller 11 waits for the wait period for the current mode (current operation mode) to elapse (step S103). For the current mode being the fast mode, the controller 11 waits for the wait period t1 for the fast mode to elapse. For the current mode being the normal mode, the controller 11 waits for the wait period t2 for the normal mode to elapse. For the current mode being the accurate mode, the controller 11 waits for the wait period t3 for the accurate mode to elapse.

After the wait period for the current mode, the controller 11 performs the recognition process (step S104). In the recognition process, the controller 11 controls the imaging device 31 to output image data and analyzes the image data from the imaging device 31 to recognize predetermined information about the inspection target. The predetermined information about the inspection target may indicate a character string printed on the inspection target or the position of a label on the inspection target. In step S104, the controller 11 also transmits the result of the recognition process to the information processor 50.

Upon completing step S104, the controller 11 ends the measurement process (FIG. 2).

When the refractive power of the liquid lens 22 is not to be changed (No in step S101), the controller 11 performs the recognition process (step S104) without performing steps S102 and S103 and then ends the measurement process.

As described above, the wait period for each mode designates the period from a change in the application voltage to the liquid lens 22 to the start of the recognition process. The refractive power of the liquid lens 22 gradually approaches the target value (the refractive power corresponding to the application voltage) after the voltage application. In response to a change in the application voltage to the liquid lens 22, the blur circle diameter of the optical system 21 changes with time as indicated by a curve 60 in FIG. 3.

Figure 3:
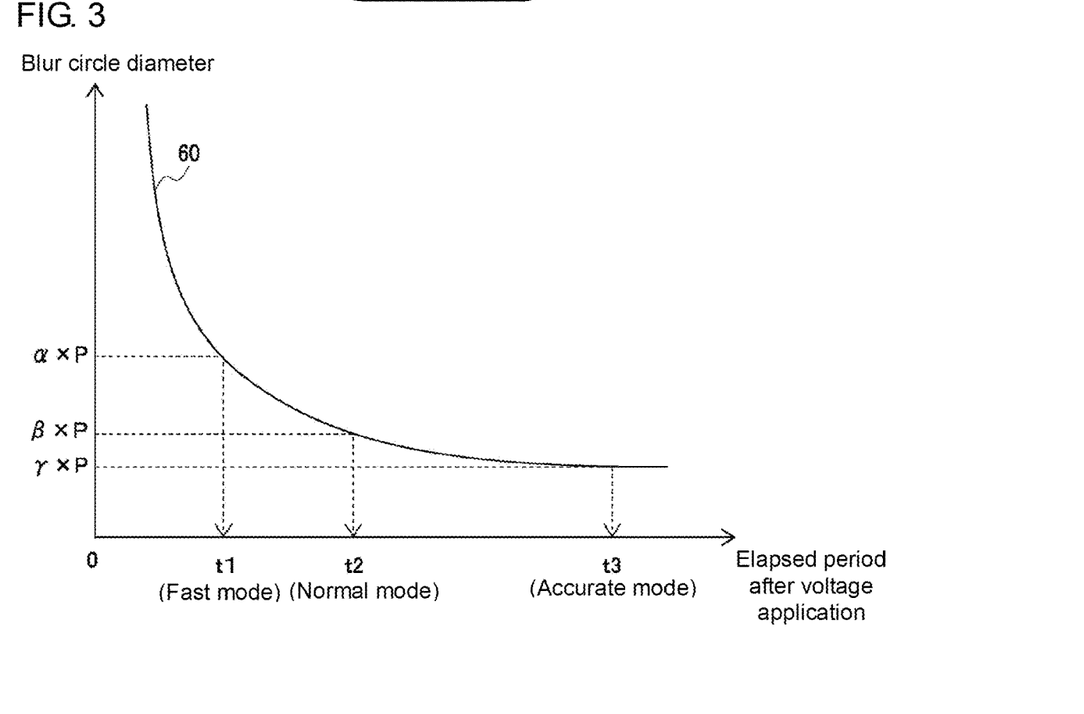
FIG. 3 is a graph showing the relationship between the elapsed period after the voltage application to a liquid lens and the blur circle diameter.

A longer wait period allows more accurate (less blurred) image data to be produced for the recognition process. However, the accuracy of image data no longer increases after the blur circle diameter is reduced to the pixel pitch P of the imaging device 31. Setting the wait period to the period that allows the blur circle diameter to match (proportionality constant)×P allows the blurring level to be estimated for each mode. The wait periods t1 to t3 for the modes are thus defined as described above.

Referring back to FIG. 1, the image sensor 1 will be described further.

The reception process (FIG. 1) is performed by the controller 11 in response to an operation-mode change request transmitted from the information processor 50.

The operation-mode change request will now be described before the reception process is described in detail.

In response to a predetermined operation, the information processor 50 (operation program) displays a screen that allows the user to directly designate the operation mode or indirectly designate the operation mode by inputting the target value for the blur circle diameter or the wait period. In response to the user directly designating the operation mode, the information processor 50 transmits the operation-mode change request including identification information about the designated operation mode to the image sensor 1. In response to the user inputting the target value for the blur circle diameter or the wait period, the information processor 50 transmits the operation-mode change request including the input target value for the blur circle diameter or the input wait period to the image sensor 1.

The reception process will now be described.

The controller 11 starts the reception process upon receiving the operation-mode change request. The controller 11 first determines whether the received operation-mode change request includes the identification information about the operation mode, the target value for the blur circle diameter, or the wait period. In response to the operation-mode change request including the identification information about the operation mode, the controller 11 updates the operation-mode designation information stored in the nonvolatile memory in the storage 12 with operation-mode designation information corresponding to the identification information. The controller 11 also stores information indicating that the current mode is the operation mode identified by the identification information.

In response to the operation-mode change request including the target value for the blur circle diameter, the controller 11 selects, from the fast mode, the normal mode, and the accurate mode, the operation mode with the blur circle diameter at the start of the recognition process closest to the target value (or, in other words, the operation mode with the blur circle diameter after the wait period for the mode closest to the target value). In some embodiments, the controller 11 may select the operation mode with the blur circle diameter at the start of the recognition process less (or greater) than or equal to the target value and closest to the target value. The controller 11 then updates the operation-mode designation information stored in the nonvolatile memory in the storage 12 with the operation-mode designation information corresponding to the selected operation mode, and stores information indicating that the current mode is the selected operation mode.

In response to the operation-mode change request including the wait period (hereafter, a designated wait period), the controller 11 selects, from the fast mode, the normal mode, and the accurate mode, the operation mode with the wait period closest to the designated wait period. In some embodiments, the controller 11 may select the operation mode with the wait period shorter (or longer) than or equal to the designated wait period and closest to the designated wait period. The controller 11 then updates the operation-mode designation information stored in the nonvolatile memory in the storage 12 with the operation-mode designation information corresponding to the selected operation mode, and stores information indicating that the current mode is the selected operation mode.

As described above, the image sensor 1 according to the present embodiment has the fast mode, the accurate mode, and the normal mode. The fast mode is faster with a shorter wait period, but is less accurate with image capturing occurring before the image comes into focus. The accurate mode is more accurate with image capturing occurring after the image has come into focus, but is slower by using a wait period until the image comes into focus. The normal mode allows operation with moderate speed and accuracy. The image sensor 1 thus allows inspection with priority given to speed or accuracy.

Second Embodiment

Figure 4:
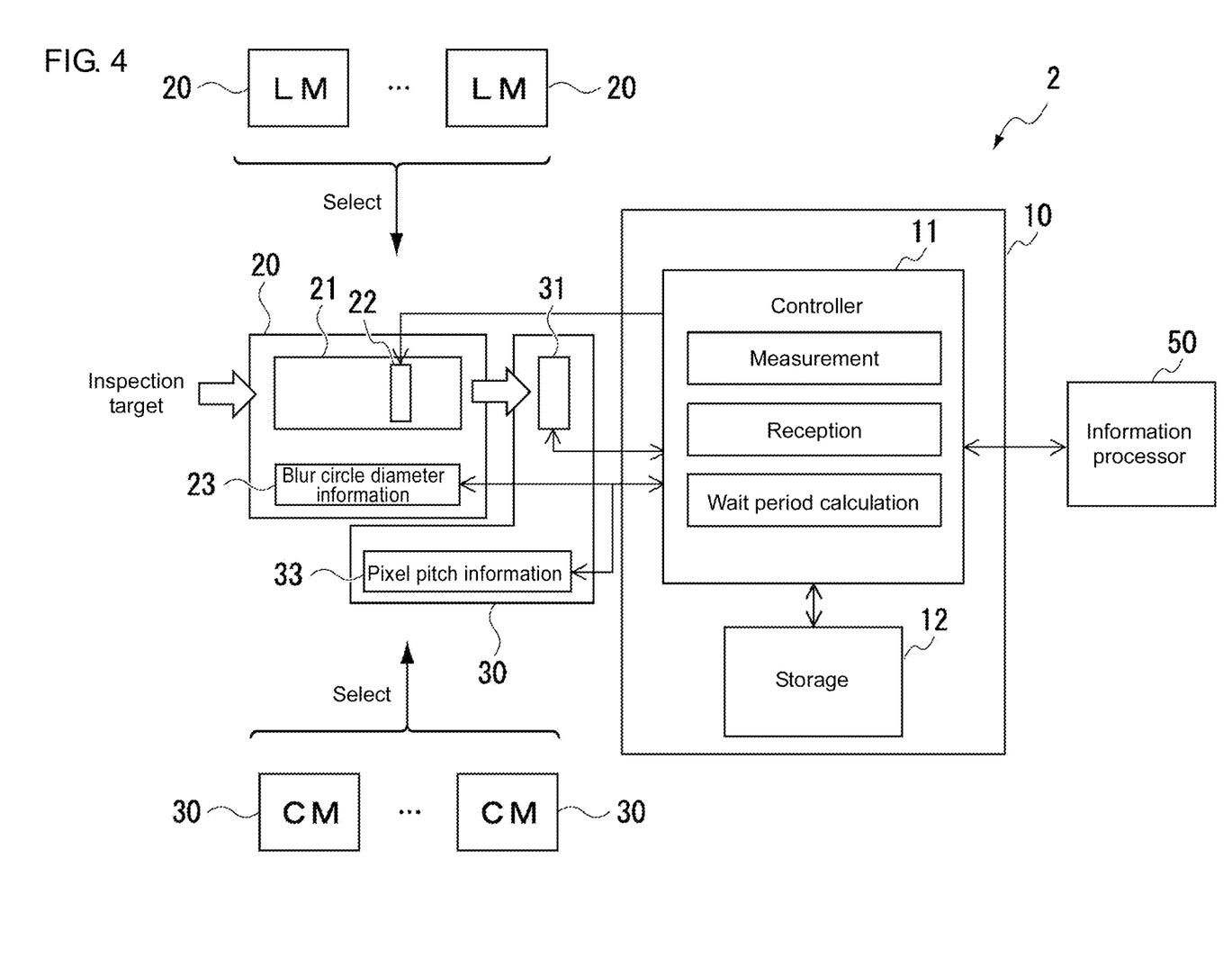
FIG. 4 is a diagram of an image sensor according to a second embodiment of the present invention.

FIG. 4 is a diagram of an image sensor 2 according to a second embodiment of the present invention.

The image sensor 2 will be described focusing on the structure and the operation different from those of the image sensor 1.

The image sensor 2 according to the present embodiment corresponds to the image sensor 1 with its components being modularized. More specifically, the image sensor 2 according to the present embodiment includes a body module 10 to which a lens module selected from multiple lens modules (LMs) 20 and an imaging module selected from multiple imaging modules (CMs) 30 are attachable, as shown in the figure.

Each imaging module 30 includes an imaging device 31 (monochrome image sensing device in the present embodiment), such as a CMOS image sensing device or a CCD image sensing device. An imaging module 30 to be attached to the body module 10 can be selected from multiple imaging modules 30 each including an imaging device 31 with different specifications (e.g., the pixel pitch and the number of pixels). Each imaging module 30 includes a nonvolatile memory 33, such as a serial electrically erasable programmable read-only memory (EEPROM), storing pixel pitch information indicating the pixel pitch of the imaging device 31 included in the imaging module 30. The pixel pitch information may indicate the pixel pitch of the imaging device 31 or a value associated with the pixel pitch.

Each lens module 20 includes an optical system 21 including a liquid lens 22. A lens module 20 can be selected from multiple lens modules 20 each including an optical system 21 with different specifications (e.g., the type of the liquid lens 22 in the optical system 21). Each lens module 20 includes a nonvolatile memory 23, such as a serial EEPROM, storing blur circle diameter information indicating a change in the blur circle diameter of the optical system 21 in the lens module 20 with time after the voltage application to the liquid lens 22. The blur circle diameter information may include coefficients in an approximation function that approximates a curve indicating the relationship between the blur circle diameter and the elapsed period (refer to the curve 60 in FIG. 2), or may include the coordinates (the blur circle diameter and the elapsed period) of multiple points on the curve.

The body module 10, to which a lens module 20 and an imaging module 30 are attachable, includes a controller 11 and a storage 12.

The controller 11 performs a measurement process, a reception process, and a wait period calculation process. The wait period calculation process will be described in detail later. The measurement process and the reception process performed by the controller 11 in the image sensor 2 are the same as the measurement process and the reception process performed by the controller 11 in the image sensor 1. The controller 11 in the image sensor 2 is operable in the fast mode, the normal mode, and the accurate mode, similarly to the controller 11 in the image sensor 1.

The storage 12 stores various items of information. The storage 12 includes a RAM to be used as a work area by the controller 11 and a nonvolatile memory such as a flash memory. The nonvolatile memory in the storage 12 in the image sensor 2 stores a wait period t1 for the fast mode, a wait period t2 for the normal mode, a wait period t3 for the accurate mode, and operation-mode designation information, similarly to the nonvolatile memory in the storage 12 in the image sensor 1. However, the wait periods t1 to t3 are not prestored in the nonvolatile memory in the storage 12 in the image sensor 2 but calculated by the wait period calculation process to be stored in the nonvolatile memory.

Figure 5:
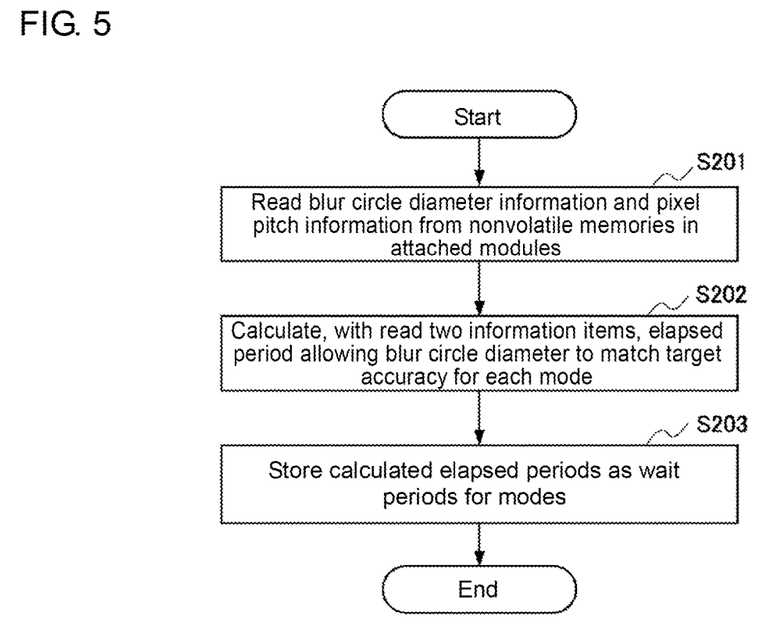
FIG. 5 is a flowchart of a wait period calculation process performed by a controller in the image sensor according to the second embodiment.

The wait period calculation process will now be described.

FIG. 5 is a flowchart of the wait period calculation process. The second controller 11 starts the wait period calculation process when the image sensor 2 is turned on. The controller 11 starting the wait period calculation process first reads blur circle diameter information from the nonvolatile memory 23 and pixel pitch information from the nonvolatile memory 33 in the modules attached to the body module 10 (step S201). The controller 11 then calculates, using the read two items of information, the elapsed period that allows the blur circle diameter to match the target accuracy for each mode (step S202). The target accuracy for a specific mode refers to the result obtained by multiplying the pixel pitch indicated by pixel pitch information by a predetermined proportionality constant for the mode. The process in step S202 is performed in accordance with the structure (data structure) of the blur circle diameter information. More specifically, the blur circle diameter information may include coefficients in an approximation function that approximates a curve indicating the relationship between the blur circle diameter and the elapsed period. In this case, step S202 includes calculating the elapsed period by substituting the target pixel pitch into the approximation function using values included in the blur circle diameter information as coefficients. The blur circle diameter information may include the coordinates (the blur circle diameter and the elapsed period) of multiple points on a curve indicating the relationship between the blur circle diameter and the elapsed period. In this case, the elapsed period is calculated by interpolation.

After step S202, the controller 11 stores, into the storage 12, the calculated elapsed periods as the wait periods t1 to t3 for the modes (step S203). The controller 11 then ends the wait period calculation process.

As described above, the image sensor 2 according to the present embodiment has the fast mode, the accurate mode, and the normal mode. The fast mode is faster with a shorter wait period, but is less accurate with image capturing occurring before the image comes into focus. The accurate mode is more accurate with image capturing occurring after the image has come into focus, but is slower by using a wait period until the image comes into focus. The normal mode allows operation with moderate speed and accuracy. The image sensor 2 thus allows inspection with priority given to speed or accuracy.

The image sensor 2 can adjust the wait period for each mode as appropriate for the combination of the lens module 20 and the imaging module 30 attached to the body module 10. The image sensor 2 according to the present embodiment thus allows inspection of various inspection targets at the speed or accuracy appropriate for the user with any combination of the lens module 20 and the imaging module 30.

Modifications

The image sensor according to the above embodiments may be modified variously. For example, although the image sensor 1 or 2 according to the above embodiments includes the imaging device 31 as a monochrome image sensing device, the imaging device 31 may be a color image sensing device. For the imaging device 31 being a single-chip color image sensing device with a Bayer array (RGB), the pixel pitch may be determined by multiplying the actual pixel pitch by a predetermined coefficient A (A>1). The image sensor 2 may be modified as described below.

Figure 6:
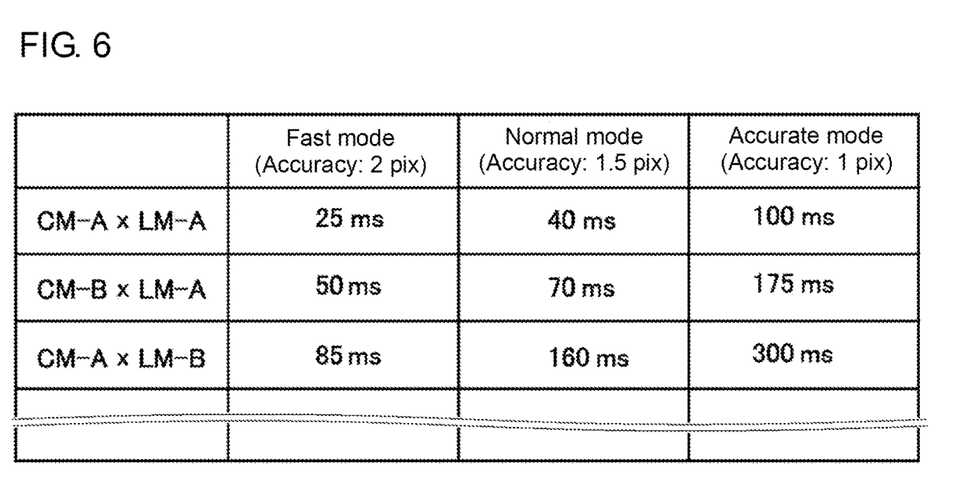
FIG. 6 is a table describing an image sensor according to a modification of the second embodiment.

The nonvolatile memory 23 in the lens module 20 and the nonvolatile memory 33 in the imaging module 30 store format information indicating the formats of the modules. The storage 12 in the body module 10 stores a wait period table as shown in FIG. 6. More specifically, the wait period table stores the wait periods for the modes for combinations of the format information about the lens modules 20 and the format information about the imaging modules 30 (e.g., LM-A×CM-A). The controller 11 in the body module 10 reads, from the wait period table, the wait period for a mode associated with the combination of format information read from the nonvolatile memory 23 and format information read from the nonvolatile memory 33.

The wait period table (FIG. 6) may be stored in an external device, such as the information processor 50. The controller 11 in the image sensor 2 may be modified to transmit, to the external device, a predetermined request including LM format information read from the nonvolatile memory 23 and CM format information read from the nonvolatile memory 33. The controller 11 may then obtain the wait period from the external device. The controller 11 in the image sensor 2 may be modified to transmit, to an external device, a predetermined request including information read from the nonvolatile memories 23 and 33 to request the external device to calculate the wait period (elapsed period).

The image sensor 1 or 2 may be modified to incorporate a range sensor for detecting the distance from the inspection target. In the refractive power control process, the controller 11 may determine the application voltage to the liquid lens 22 based on the distance detected by the range sensor and apply the determined voltage to the liquid lens 22. In the refractive power control process, the controller 11 in the image sensor 1 or 2 may be modified to determine the application voltage to the liquid lens 22 based on the distance detected by the range sensor, which is located near the production line for the inspection target separately from the image sensor 1 or 2, and apply the determined voltage to the liquid lens 22.

The image sensor 1 or 2 may be modified to separately receive the instruction for controlling the liquid lens 22 and the instruction for analyzing image data. The image sensor 1 or 2 may automatically switch the mode, such as automatically switching the operation mode to a more accurate mode in response to unsuccessful recognition of information or automatically switching the operation mode in response to, for example, the color of inspection targets. The image sensor 2 may be modified to include the body module 10 incorporating the imaging device 31 (with the lens module 20 alone being detachable). The image sensor 2 may be modified to use a constant wait period for the accurate mode. More than or less than three modes may be included.

APPENDIX

An image sensor (1; 2), comprising:
an imaging device (31);
an optical system (21) including a liquid lens (22) to form an image of a subject on an imaging surface of the imaging device (31); and
a controller (11) configured to perform a refractive power control process of adjusting an application voltage applicable to the liquid lens (22) to control a refractive power of the liquid lens (22), and a recognition process of analyzing image data from the imaging device (31) to recognize predetermined information about the subject, the controller (11) being operable in a plurality of operation modes each with a different wait period from a change in the application voltage to the liquid lens (22) in response to the refractive power control process to a start of the recognition process.

REFERENCE SIGNS LIST

1, 2 image sensor
10 body module
11 controller
12 storage
20 lens module
21 optical system
22 liquid lens
23, 33 nonvolatile memory
30 imaging module
31 imaging device
50 information processor

The invention claimed is:

1. An image sensor, comprising:
an imaging device;
an optical system including a liquid lens to form an image of a subject on an imaging surface of the imaging device; and
a controller configured to perform a refractive power control process of adjusting an application voltage applicable to the liquid lens to control a refractive power of the liquid lens, and a recognition process of analyzing image data from the imaging device to recognize predetermined information about the subject, the controller being operable in a plurality of operation modes each with a different wait period from a change in the application voltage to the liquid lens in response to the refractive power control process to a start of the recognition process.

2. The image sensor according to claim 1, further comprising:
a body module including the controller; and
a lens module including the optical system and a memory, the memory storing first information indicating a specification for the lens module or a type of the lens module,
wherein the controller changes, based on the first information read from the memory included in the lens module, the wait period for at least one of the plurality of operation modes to a period corresponding to the lens module.

3. The image sensor according to claim 2, wherein the controller operates in an operation mode of the plurality of operation modes designated by a user.

4. The image sensor according to claim 2, wherein based on a target value for a blur circle diameter designated by a user, the controller selects, from the plurality of operation modes, an operation mode with a blur circle diameter at the start of the recognition process closest to the target value, and operates in the selected operation mode.

5. The image sensor according to claim 2, wherein the controller selects, from the plurality of operation modes, an operation mode with a wait period closest to a wait period designated by a user, and operates in the selected operation mode.

6. The image sensor according to claim 1, further comprising:
a body module including the controller;
an imaging module including the imaging device; and
a lens module including the optical system and a memory, the memory storing first information indicating a specification for the lens module or a type of the lens module,
wherein the controller changes, based on the first information read from the memory included in the lens module and second information read from a memory included in the imaging module, the wait period for at least one of the plurality of operation modes to a period corresponding to a combination of the lens module and the imaging device included in the imaging module.

7. The image sensor according to claim 6, wherein the first information includes blur circle diameter information indicating a change in a blur circle diameter with time after the application voltage is applied to the liquid lens,
the second information includes pixel pitch information indicating a pixel pitch of the imaging device, and
the controller changes, based on the blur circle diameter information and the pixel pitch information, the wait period for each of the plurality of operation modes to a period that allows a blur circle diameter at the start of the recognition process to match a dimension associated with the operation mode.

8. The image sensor according to claim 1, wherein the controller operates in an operation mode of the plurality of operation modes designated by a user.

9. The image sensor according to claim 1, wherein
based on a target value for a blur circle diameter designated by a user, the controller selects, from the plurality of operation modes, an operation mode with a blur circle diameter at the start of the recognition process closest to the target value, and operates in the selected operation mode.

10. The image sensor according to claim 1, wherein
the controller selects, from the plurality of operation modes, an operation mode with a wait period closest to a wait period designated by a user, and operates in the selected operation mode.

* * * * *